US012596039B2

(12) United States Patent
Tanaami et al.

(10) Patent No.: US 12,596,039 B2
(45) Date of Patent: Apr. 7, 2026

(54) FORCE SENSOR MODULE

(71) Applicants: SINTOKOGIO, LTD., Nagoya (JP); TOHOKU UNIVERSITY, Sendai (JP)

(72) Inventors: Yoshikane Tanaami, Nagoya (JP); Miyuki Hayashi, Nagoya (JP); Yoshiaki Kanamori, Sendai (JP); Taiyu Okatani, Sendai (JP)

(73) Assignees: SINTOKOGIO, LTD., Aichi (JP); TOHOKU UNIVERSITY, Miyagi (JP)

( * ) Notice: Subject to any disclaimer, the term of this patent is extended or adjusted under 35 U.S.C. 154(b) by 181 days.

(21) Appl. No.: 18/179,547

(22) Filed: Mar. 7, 2023

(65) Prior Publication Data

US 2023/0314246 A1 Oct. 5, 2023

(30) Foreign Application Priority Data

Mar. 31, 2022 (JP) ................................ 2022-059542

(51) Int. Cl.
*G01L 1/24* (2006.01)

(52) U.S. Cl.
CPC .................................... *G01L 1/24* (2013.01)

(58) Field of Classification Search
CPC ........................................................ G01L 1/24
USPC ........................................................... 73/800
See application file for complete search history.

(56) References Cited

U.S. PATENT DOCUMENTS 2,752,558 A * 6/1956 Kane ..................... G01L 9/0002 73/725
4,933,545 A 6/1990 Saaski et al.
5,483,994 A * 1/1996 Maurer ................... G01L 9/006 73/706
5,703,282 A * 12/1997 Kuesell ................... G01L 23/18 73/714

(Continued)

FOREIGN PATENT DOCUMENTS

CN 1649803 A 8/2005
DE 4103706 A1 * 2/1991 ............. G01L 23/10

(Continued)

OTHER PUBLICATIONS

Translation of DE4103706A1 (Year: 1991).*

(Continued)

*Primary Examiner* — Nathaniel T Woodward
(74) *Attorney, Agent, or Firm* — Harness, Dickey & Pierce, P.L.C.

(57) ABSTRACT

A force sensor module includes: a force sensor configured to detect an external force according to the amount of deflection of a strain element that deflects in response to the external force; a housing that accommodates the force sensor; and a force transferring section configured to transfer the external force to the strain element, the force transferring section being accommodated in the housing so as to be in contact with the strain element and having a part that includes an end of the force transferring section and that protrudes outside the housing through a surface of the housing, the amount of protrusion of the part of the force (Continued)

transferring section measured from the surface of the housing being set such that the force sensor is not damaged even in a case where the end lies in the same plane as the surface of the housing.

11 Claims, 6 Drawing Sheets

(56) References Cited

U.S. PATENT DOCUMENTS

| | | | | |
|---|---|---|---|---|
| 6,364,352 | B1 * | 4/2002 | Norton | G01L 1/02 280/735 |
| 6,820,487 | B2 | 11/2004 | Esashi et al. | |
| 8,066,681 | B1 | 11/2011 | Hall et al. | |
| 9,201,105 | B2 | 12/2015 | Iida et al. | |
| 9,534,972 | B2 * | 1/2017 | Eichhorn | G01L 9/0054 |
| 9,785,297 | B2 | 10/2017 | Kawaguchi et al. | |
| 10,886,605 | B2 | 1/2021 | Varel et al. | |
| 2004/0083825 | A1 | 5/2004 | Tsutaya | |
| 2005/0138892 | A1 | 6/2005 | Misonou | |
| 2007/0040817 | A1 * | 2/2007 | Underwood | G06F 3/0321 345/179 |
| 2007/0107522 | A1 | 5/2007 | Oikawa et al. | |
| 2010/0148341 | A1 | 6/2010 | Fuji et al. | |
| 2014/0312342 | A1 | 10/2014 | Yamazaki | |
| 2014/0318273 | A1 | 10/2014 | Dong et al. | |
| 2015/0241287 | A1 | 8/2015 | Sato et al. | |
| 2016/0349128 | A1 * | 12/2016 | Kaufmann | G01L 7/084 |
| 2018/0072186 | A1 | 3/2018 | Nakazaki et al. | |
| 2018/0329115 | A1 | 11/2018 | Guler et al. | |
| 2019/0064532 | A1 | 2/2019 | Riley, Jr. et al. | |
| 2020/0158557 | A1 * | 5/2020 | Le Floc'H | G01F 1/662 |
| 2020/0386619 | A1 | 12/2020 | Kanamori et al. | |
| 2021/0088392 | A1 | 3/2021 | Kagan et al. | |
| 2023/0266188 | A1 | 8/2023 | Tanaami et al. | |
| 2023/0314247 | A1 | 10/2023 | Tanaami et al. | |

FOREIGN PATENT DOCUMENTS

| | | | |
|---|---|---|---|
| JP | H02-204724 | A | 8/1990 |
| JP | H04-104026 | A | 4/1992 |
| JP | H05-256871 | A | 10/1993 |
| JP | H0622940 | U | 3/1994 |
| JP | 2000/294759 | A | 10/2000 |
| JP | 2004-156937 | A | 6/2004 |
| JP | 2004/311345 | A | 11/2004 |
| JP | 2005-208043 | A | 8/2005 |
| JP | 2010-145176 | A | 7/2010 |
| JP | 2014-225006 | A | 12/2014 |
| JP | 5660122 | B2 | 1/2015 |
| JP | 2015-161531 | A | 9/2015 |
| JP | 2017-210235 | A | 11/2017 |
| JP | 2020-094973 | A | 6/2020 |
| WO | 2018/061679 | A1 | 4/2018 |
| WO | 2019/039371 | A1 | 2/2019 |
| WO | 2020/014356 | A1 | 1/2020 |

OTHER PUBLICATIONS

U.S. Office Action for corresponding U.S. Appl. No. 18/112,179 mailed Apr. 7, 2025.

Office Action dated Nov. 11, 2025 issued in Japanese patent application No. 2022-059542.

Office Action dated Dec. 2, 2025 issued in Japanese patent application No. 2022-027127.

Office Action dated Dec. 9, 2025 issued in Japense patent application No. 2022-059543.

* cited by examiner

FORCE SENSOR MODULE

This Nonprovisional application claims priority under 35 U.S.C. § 119 on Patent Application No. 2022-059542 filed in Japan on Mar. 31, 2022, the entire contents of which are hereby incorporated by reference.

TECHNICAL FIELD

The present invention relates to a force sensor module.

BACKGROUND ART

For example, in the force sensor module as disclosed in Patent Literature 1, light enters a metasurface pattern, and the light that passes through the metasurface pattern and that is reflected by a reflective layer is used to obtain information concerning a spacing between the metasurface pattern and the reflective layer. The spacing depends on the magnitude of a force acting in the normal direction of the principal surface of a second substrate. The force sensor module is therefore capable of detecting the magnitude of a force, along one axis direction, acting on the second substrate by using an optical technique.

CITATION LIST

Patent Literature

[Patent Literature 1]
Japanese Patent Application Publication, Tokukai, No. 2020-94973

SUMMARY OF INVENTION

Technical Problem

In the force sensor module illustrated in FIG. 29 of Patent Literature 1, a spacing d (air gap d) between the reflective layer and the metasurface pattern decreases according to the load applied on the second substrate. In a case where this force sensor module is used, measuring the spacing d by an optical technique makes it possible to detect a load corresponding to the spacing d measured.

Incidentally, when a load greater than the load expected at the time of design is applied to such a force sensor module, at least one of the group consisting of the second substrate and the metasurface pattern could be damaged.

The force sensor module in accordance with an aspect of the present invention has been made in view of the above problem. An object of an aspect of the present invention is to provide a force sensor module that is not damaged even when a load greater than the load expected at the time of design is applied.

Solution to Problem

In order for the above problem to be solved, a force sensor module in accordance with an aspect of the present invention includes a force sensor, a housing, and a force transferring section. The force sensor includes a strain element that deflects in response to an external force, and detects the external force according to the amount of deflection of the strain element. The housing accommodates the force sensor. The force transferring section transfers the external force to the strain element. The force transferring section is accommodated in the housing so as to be in contact with the strain element, and has a part that includes an end of the force transferring section and that protrudes outside the housing through a surface of the housing. The amount of protrusion of the part of the force transferring section measured from the surface of the housing is set such that the force sensor is not damaged even in a case where the end lies in the same plane as the surface of the housing.

Advantageous Effects of Invention

According to an aspect of the present invention, it is possible to provide a force sensor module that is not damaged even when a load greater than the load expected at the time of design is applied.

DESCRIPTION OF EMBODIMENTS

Embodiment 1

The following description will discuss an embodiment of a force sensor module in accordance with the present invention in detail. First, the configuration of the main part of the force sensor module will be described.

<Main Part of Force Sensor Module>

Figure 1:
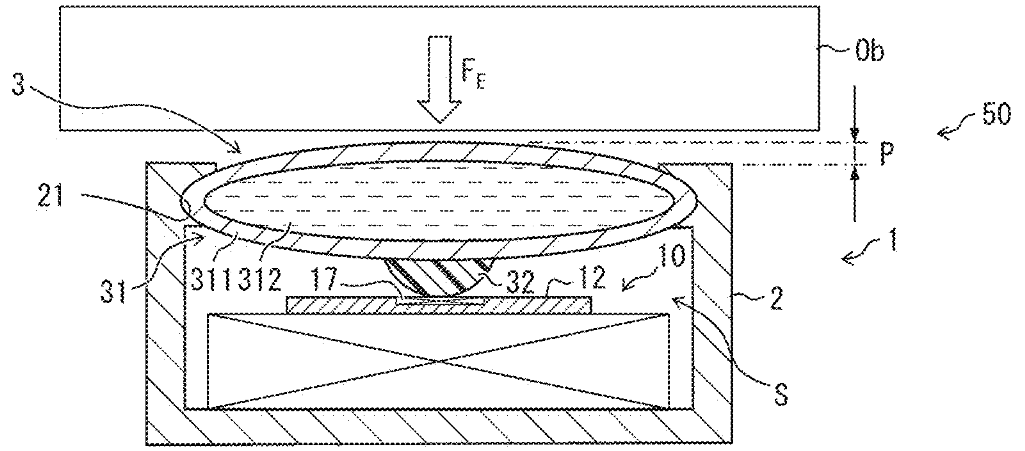
FIG. 1 is a cross-sectional view of the main part of a force sensor module in accordance with Embodiment 1 of the present invention.

FIG. 1 is a cross-sectional view of the main part of a force sensor module in accordance with Embodiment 1. A main part 1 of a force sensor module 50 includes: a housing 2; a force transferring section 3; and a force sensor 10.

Although the details will be described later, the force transferring section 3 has a part including an end thereof and protruding outside the housing 2 through the surface of the housing 2, and when a point load $F_E$ acts on the end, the force transferring section 3 transfers the point load $F_E$ (external force) to a part of the force sensor 10. The part of the force sensor 10 is designed to deflect in response to the point load $F_E$ (external force) when the external force is transferred to the part of the force sensor 10, and the force sensor 10 is thus capable of detecting the external force according to the amount of the deflection.

(Housing 2)

The housing 2 accommodates the force sensor 10. The space accommodating the force sensor 10 in the housing 2 is referred to as an accommodation space S. The force sensor 10 is provided at the bottom of the accommodation space S.

The housing 2 is provided with an opening 21 in the upper portion thereof, the upper portion being on the opposite side of the housing 2 from the bottom. The opening 21, in which the force transferring section 3 is disposed, is blocked by the force transferring section 3. With this configuration, the accommodation space S is nearly sealed.

The housing 2 can be made of a hard material such as a flame-retardant resin. The length (height) from the bottom of the accommodation space S to the opening 21 is fixed.

Although it is possible to install the force transferring section 3 and the force sensor 10 in the accommodation space S of the housing 2 through the opening 21, the force transferring section 3 and the force sensor 10 may be installed through another opening provided, for example, at the bottom of the housing 2.

(Force Transferring Section 3)

The force transferring section 3 is provided in the opening 21 of the housing 2. The force transferring section 3 has a part including an end thereof and protruding outside the housing 2 through a surface of the housing 2, so that the force transferring section 3 is capable of receiving the point load $F_E$ that is exerted from outside the opening of the housing 2. The force transferring section 3 is accommodated in the housing 2 so as to be in contact with a surface (hard-coat layer 17) of the force sensor 10, the surface facing the opening 21.

The force transferring section 3 includes a fluid spring 31 and a projection 32. The fluid spring 31 is formed by an elastic body 311 containing a fluid 312 therein.

The fluid spring 31 includes: the elastic body 311 having a hollow portion; and the fluid 312 with which the hollow portion is filled. As the above-described part of the force transferring section 3, a part of the elastic body 311 protrudes outside the housing 2. The fluid spring 31 is a so-called diaphragm, and is provided in the opening 21 of the housing 2 such that the direction of expansion and contraction of the spring substantially coincides with the direction in which the point load $F_E$ is applied.

The elastic body 311 is preferably, but not necessarily, made of a metal material such as stainless steel.

The fluid 312 is preferably, but not necessarily, oil or air.

The projection 32 is interposed between the elastic body 311 and the surface (hard-coat layer 17), facing the opening 21, of the force sensor 10 and projects from the elastic body 311. In the present example, the projection 32 is formed by a substantially hemispherical structure that projects from the elastic body 311 toward the force sensor 10, and the end region of the substantially hemispherical structure is in contact with the surface, facing the force sensor 10, of the opening 21.

The projection 32 structurally projects most at a position along the central axis (the location in which the spring expansion and contraction are caused most) of the fluid spring 31.

The projection 32 only needs to be made of a material that is less prone to deformation than the elastic body 311 is. By way of example but not as a limitation, the projection 32 can be made of a resin material such as silicone. The projection 32 may be joined to the elastic body 311 in an appropriate manner.

The force transferring section 3 as described above is capable of transferring the point load $F_E$ (external force) to the surface (hard-coat layer 17), facing the opening 21, of the force sensor 10. This can be implemented by protruding of a part of an end of the fluid spring 31 outside the housing 2 through a surface of the housing 2, the surface corresponding to the portion in which the opening 21 is provided. Further, as will be described later, the force transferring section 3 is provided in the opening 21 such that the amount of protrusion of the part of the force transferring section 3 protruding outside the housing 2 is appropriate.

(Force Sensor 10)

The force sensor 10 includes a strain element that deflects in response to an external force. In the example of FIG. 1, the strain element that deflects in response to an external force is illustrated as a second substrate 12. The second substrate 12 has the hard-coat layer 17 having a non-slip structure at least in a region facing the projection 32 of the force transferring section 3. Because of being a spherical body, the projection 32 of the force transferring section 3 can have an inclination with respect to the normal direction of the principal surface of the second substrate 12, depending on the direction in which the point load $F_E$ (external force) acts. In this case, the non-slip structure provided to the hard-coat layer 17 makes it possible to prevent the projection 32 from sliding sideways. The non-slip structure can be implemented by forming irregularities on the surface of the hard-coat layer 17. The non-slip structure may be implemented by applying anti-glare coating to the hard-coat layer 17.

The force sensor 10 only needs to be a force sensor that includes a strain element and that detects the above-described external force according to the amount of deflection of the strain element. As an example, a metamaterial sensor as will be described later can be employed as the force sensor 10. The second substrate 12 and the hard-coat layer 17 will be described later.

<Point Load (External Force) Acting on Force Transferring Section 3>

The amount of protrusion of the part of the force transferring section 3 measured from the surface of the housing 2 is set such that the force sensor is not damaged even in a case where the end of the force transferring section 3 (the end of the fluid spring 31) lies in the same plane as the surface of the housing 2. The amount of protrusion corresponds to a length P illustrated in FIG. 1.

In short, in the example illustrated in FIG. 1, a load applying object Ob, the load applying object Ob bringing about the point load $F_E$ (external force) that is to act on the force transferring section 3 from outside the housing 2, presses the fluid spring 31 toward the second substrate 12, which is a strain element, for a while after the force transferring section 3 starts to contact the end (the end of the fluid spring 31). At this time, through the second substrate 12 having been deflected by receiving the pressing force, the force sensor 10 detects the point load (external force). When the fluid spring 31 is further pressed, once the end of the force transferring section 3 (the end of the fluid spring 31) has reached the same plane in which the surface of the housing 2 lies, the surface of the housing 2 prevents the load applying object Ob from further moving in the load-applying direction. This prevents the end of the force transferring section 3 (the end of the fluid spring 31) from further moving beyond a position on the same plane in which the surface of the housing 2 lies, toward the second substrate 12. Such prevention of further movement avoids excessive application of the point load to the second substrate 12. Thus, the force sensor 10 is designed so as not to be damaged upon reception of an excessive point load.

In order for the length P illustrated in FIG. 1 to be determined as described above, it is necessary to set as appropriate the positional relationship between the housing 2, the force transferring section 3, and the force sensor 10. In order for the force transferring section 3 to be installed in the opening 21 of the housing 2, a positioning mechanism may be provided to allow fine adjustment of position.

The main part 1, illustrated in FIG. 1, of the force sensor module 50 can constitute the force sensor module all by itself, provided that the main part 1 alone is capable of detecting an external force. Alternatively, as in Embodiment 3 described later, in a case of a force sensor module that detects external force on the basis of the input and output of light to and from the metamaterial sensor, a component may be included, in addition to the main part 1, in the force sensor module.

In the force sensor module in accordance with Embodiment 1, even when a load greater than the load expected at the time of design is applied to the force transferring section, the end of the force transferring section is not pressed to be deeper than a plane in which the surface of the housing lies. Accordingly, Embodiment 1 makes it possible to provide a force sensor module that is not damaged even when a load greater than the load expected at the time of design is applied. Further, since the force transferring section includes the fluid spring formed by an elastic body containing a fluid therein, it is possible to reduce external-force loss that can be generated when the direction an external force acting on the force transferring section is inclined with respect to the normal direction of the principal surface of the second substrate. The force sensor module in accordance with Embodiment 1 therefore makes it possible to increase the accuracy of detecting an external force. Further, providing the projection 32 enables an external force to act at a predetermined position in the force sensor 10 (second substrate 12), which is a strain element. Furthermore, in Embodiment 1, since the second substrate 12 has the non-slip structure at least in a region thereof that faces the projection 32 of the force transferring section 3, it is possible to reduce slipping of the projection 32 and reduce the loss of an external force accordingly. The present force sensor module thus makes it possible to increase the accuracy of detecting an external force.

Embodiment 2

The following description will discuss another embodiment of the present invention. For convenience of explanation, the same reference numerals will be given to members having the same functions as the members described in the above embodiment, and the descriptions of such members are not repeated.

Figure 2:
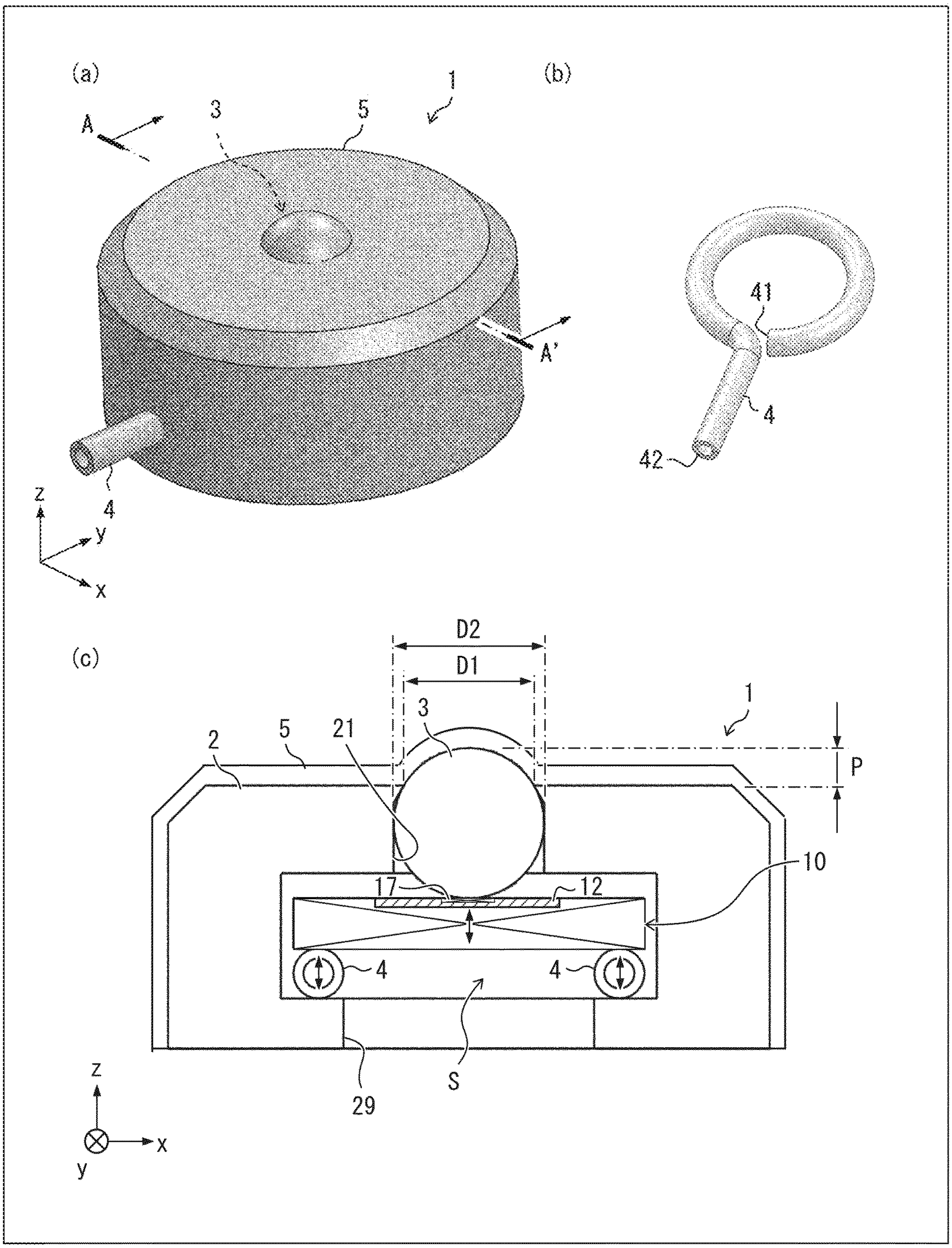
FIG. 2 is a diagram illustrating the configuration of the main part of a force sensor module in accordance with Embodiment 2 of the present invention, the diagram including: (a) that is an external view of the main part; (b) that is a perspective view of a preload adjustment mechanism provided in the main part; and (c) that is a cross-sectional view taken along the line A-A' in (a).

The surface of a main part 1 of a force sensor module is covered by a covering portion 5, and a protruding part of a force transferring section 3 protrudes from a sensing surface at the center of the sensing surface with the protruding part being covered by the covering portion 5, as illustrated in (a) of FIG. 2. On the lateral surface of the main part, a preload adjustment mechanism 4, the whole of which is illustrated in (b) of FIG. 2, is partially exposed.

As illustrated in the cross-sectional view of (c) of FIG. 2, the main part 1 of the force sensor module is provided with a housing 2 under the covering portion 5. In an accommodation space S of the housing 2, a force sensor 10 including a strain element (second substrate 12) is provided.

On the second substrate 12-side of the force sensor 10, a force transferring section 3 that transfers an external force to the second substrate 12 is provided.

(Force Transferring Section 3)

The force transferring section 3 is, for example, a spherical body which is a perfect circle in cross section and is provided so as to be fitted into an opening 21 of the housing 2.

The spherical body force transferring section 3 has an end that faces the accommodation space S of the housing 2 and that is in contact with the force sensor 10. The spherical body force transferring section 3 has another end that faces outward from the opening 21 of the housing 2 and that protrudes through the surface of the housing 2.

(Housing 2)

The opening 21 of the housing 2 has an inner diameter D2 equal to the diameter of the spherical body force transferring section 3. However, in a region close to the outside, the inner diameter is narrower when closer to the outside, such that an inner diameter D1 is smaller than the diameter of the spherical body force transferring section 3. This configuration makes it possible to prevent the spherical body force transferring section 3 from inconveniently moving outside through the opening 21.

Also on the opposite side of the housing 2 from the opening 21, i.e., at the bottom of the housing 2, an open region 29 on the bottom side is provided. It is possible to pull, out of the main part 1, for example, a component (such as an optical fiber which will be described later) connected to the force sensor 10 via the open region 29. Further, although the open region 29 can be used as a passage when the force transferring section 3, the force sensor 10, and the preload adjustment mechanism 4 are provided in the accommodation space S, another opening may be provided in the housing 2 to be used as the passage.

(Covering Portion 5)

The covering portion 5 is implemented by a boot covering the opening 21 of the housing 2 and the vicinity of the opening 21, as an example. Such covering with the covering portion 5 makes it possible to prevent dust from entering the accommodation space S through the opening 21. The covering portion 5 can be made of a resin, as an example.

(Preload Adjustment Mechanism 4)

The preload adjustment mechanism 4 adjusts a position, in the normal direction of the principal surface of the force sensor 10, of the force sensor 10 in the accommodation space S, to adjust the preload to be applied to the strain element. As used herein, the preload is a force that is being applied by the force transferring section to the strain element under the condition where the external force is not applied to the force transferring section.

The preload adjustment mechanism 4 includes a tube 42 that is an elastic body containing a fluid 41 therein, a part of the elastic body tube 42 constitutes an annular portion, and the other part constitutes a straight portion. The annular portion is disposed adjacent to the force sensor 10, on the opposite side of the force sensor 10 from the strain element (second substrate 12). The elastic body tube 42 is capable of containing a fluid therein, and is capable of adjusting the tube diameter of the elastic body tube 42 according to the amount of the fluid contained. By disposing such a preload adjustment mechanism 4 on the opposite side of the force sensor 10 from the strain element (second substrate 12), a position, in the normal direction of the principal surface of the force sensor 10, of the force sensor 10 in the accommodation space S is adjusted.

The straight portion is exposed to the outside from the lateral surface of the housing 2. In FIG. 2, the exposed straight tube is open at a tube end thereof. This merely indicates the open state in which to adjust the amount of fluid as described above in the process of producing the force sensor module. The tube end is closed by an appropriate method when the force sensor module is shipped.

The elastic body tube 42 can be made of a material resistant to friction, and can be made of a polyacetal resin (POM) as an example. By way of example but not as a limitation, an oil can be employed as the fluid 41.

As in Embodiment 2, the optical force sensor using the metasurface pattern and the reflective layer exhibits response characteristics of light that are not linear with respect to a change in the spacing between the metasurface pattern and the reflective layer. In light of this, since, for example, it is possible to adjust the preload using the preload adjustment mechanism before shipment, it is possible to increase the range of variations of feasible response characteristics.

<Point Load (External Force) Acting on Force Transferring Section 3>

Like in Embodiment 1, in Embodiment 2, the amount of protrusion of the part of the force transferring section 3 measured from the surface of the housing 2 is set such that the force sensor is not damaged even in a case where the end of the force transferring section 3 (the end of the fluid spring 31) lies in the same plane as the surface of the housing 2. The amount of protrusion corresponds to the length P illustrated in (c) of FIG. 2.

In short, as in the example illustrated in FIG. 1, in the example illustrated in (c) of FIG. 2, a load applying object that brings about the point load $F_E$ (external force) acting on the force transferring section 3 from outside the housing 2 presses the force transferring section 3 toward the second substrate 12, which is a strain element, for a while after the contact (contact via the covering portion 5) with the end of the force transferring section 3 begins. At this time, through the second substrate 12 having been deflected by receiving the pressing force, the force sensor 10 detects the point load (external force). When the force transferring section 3 is further pressed, once the end of the force transferring section 3 has reached the same plane in which the surface of the housing 2 lies, the surface of the housing 2 prevents the load applying object from further moving in the load-applying direction. This prevents the end of the force transferring section 3 from further moving beyond a position on the same plane in which the surface of the housing 2 lies, toward the second substrate 12. Such prevention of further movement avoids excessive application of the point load on the second substrate 12. Thus, the force sensor 10 is designed so as not to be damaged upon reception of an excessive point load.

Embodiment 3

The following description will discuss another embodiment of the present invention. For convenience of explanation, the same reference numerals will be given to members having the same functions as the members described in the above embodiment, and the descriptions of such members are not repeated.

Figure 3:
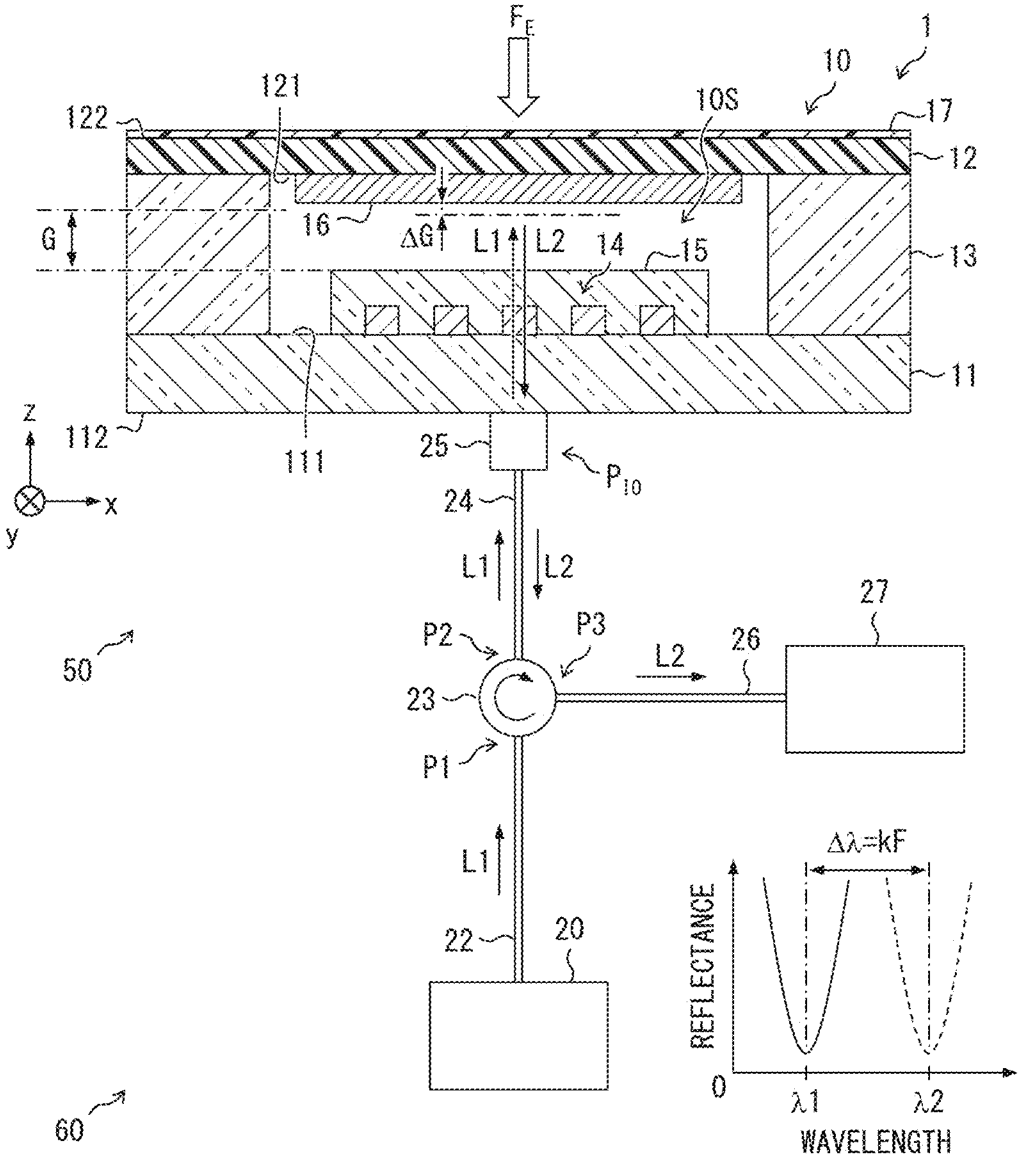
FIG. 3 is a diagram illustrating an embodiment of the force sensor module in accordance with Embodiment 1 of the present invention and including a cross-sectional view of the main part.
Figure 4:
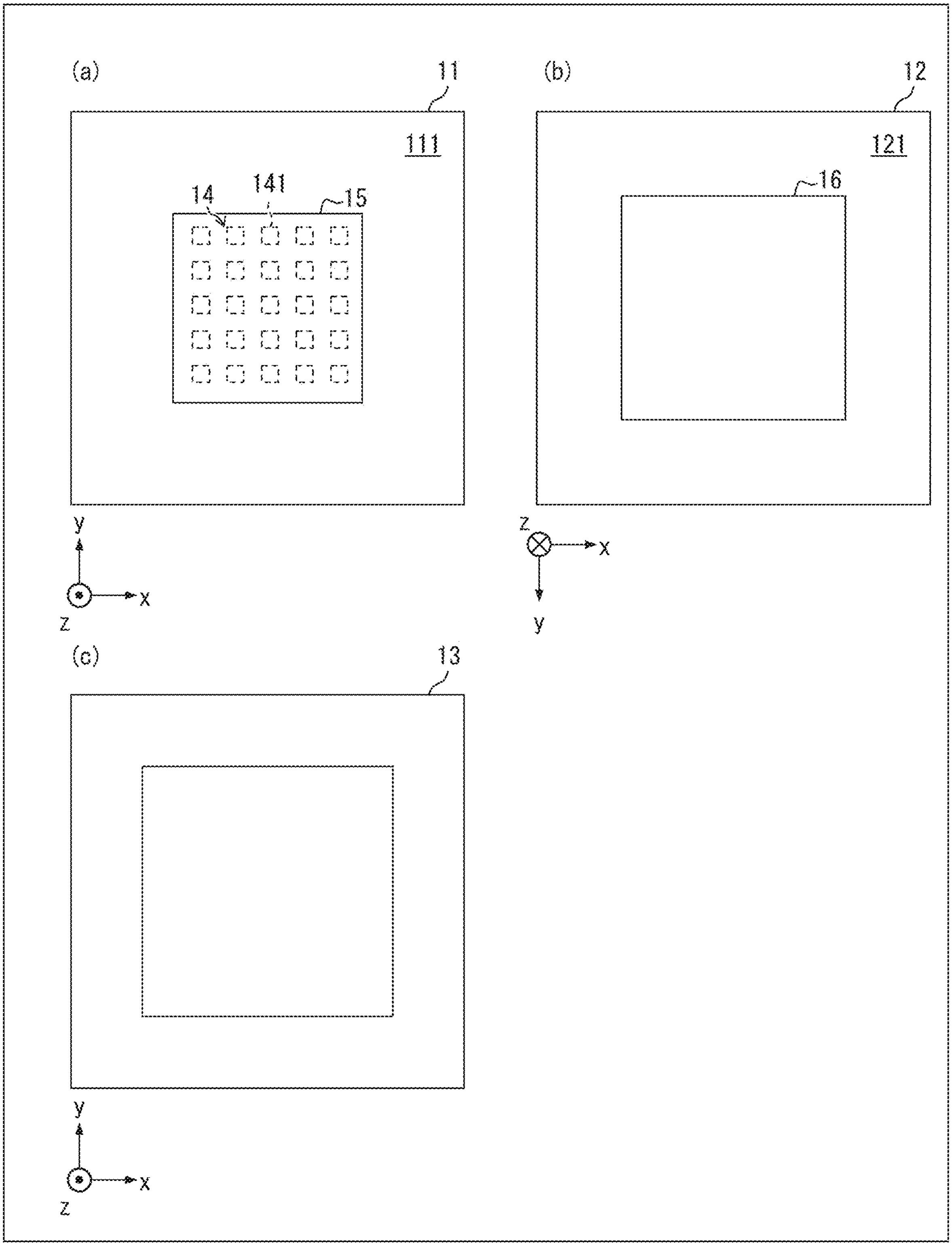
FIG. 4 is a diagram including: (a) to (c) that are respective plan views of a first substrate, a second substrate, and a spacer that constitute a force sensor provided in the main part illustrated in, for example, FIG. 1.

The following description will discuss an aspect of the force sensor 10 of each of the above embodiments and a force sensor module including the same, with reference to FIGS. 3 and 4.

In FIG. 3, for convenience of explanation, the housing 2, the force transferring section 3, and the covering portion 5 described in the above embodiments are not illustrated.

(Configuration of Force Sensor 10)

The force sensor 10 is a metamaterial sensor. Specifically, the force sensor 10 includes: a first substrate 11; a second substrate 12 (strain element); a spacer 13; a metasurface pattern 14; a protective layer 15; a reflective layer 16; and a hard-coat layer 17 (strain element). In the force sensor 10, a point load $F_E$ is detected under the condition where, among the first substrate 11 and the second substrate 12, the second substrate 12 is subjected to the action of the point load $F_E$.

<First Substrate 11>

Non-alkali glass is employed as a material of the first substrate 11. Non-alkali glass, which does not contain any alkali component, is resistant to surface erosion by chemicals and water, and is excellent in electrical insulation. The material of the first substrate 11 only needs to be a solid material transparent to light of the wavelength band of light L1 (which will be described later), and can be appropriately selected from among commercially available materials. Other examples of the material of the first substrate 11 include: quartz; and a polycarbonate resin. In Embodiment 3, the wavelength band of the light L1 is not less than 1400 nm and not more than 1600 nm.

In Embodiment 3, the shape (see (a) of FIG. 4) of the first substrate 11 in plan view is a 4-cm square. In Embodiment 3, the thickness of the first substrate 11 is 500 μm. The shape and thickness of the first substrate 11 are not limited to the above example, but can be appropriately determined. The thickness of the first substrate 11 is preferably not less than 500 μm and not more than 2000 μm.

The first substrate 11 includes a principal surface 111 and a principal surface 112 that are opposed to each other and that constitute a pair of principal surfaces. In the condition illustrated in FIG. 1, the first substrate 11 is disposed such that the principal surface 111 is located on the upper side and the principal surface 112 is located on the lower side. The principal surface 111 is an example of the first principal surface.

In the force sensor 10, the second substrate 12 is subjected to the action of the point load $F_E$, as described above. In such a condition, the force sensor 10 uses the deflection of the second substrate 12 due to the point load $F_E$, to detect the point load $F_E$. Therefore, the first substrate 11 is preferably designed such that when the second substrate 12 is subjected to the action of the point load $F_E$, the first substrate 11 does not deflect or only deflects to the extent that can be ignored when compared to the amount of deflection of the second substrate 12.

The metasurface pattern 14 is provided on the principal surface 111 of the first substrate 11, as illustrated in FIG. 3 and (a) of FIG. 4. Note that the metasurface pattern 14 is covered by the protective layer 15, and is therefore indicated by dashed lines in (a) of FIG. 4.

The metasurface pattern 14 consists of a plurality of sub patterns 141 (25 sub patterns 141 in (a) of FIG. 4) that are periodically arranged. In Embodiment 3, the sub patterns 141 are arranged in a matrix with five rows and five columns. Note that (a) of FIG. 4 is a schematic view for illustrating the sub patterns 141 in an understandable manner. In actuality, the metasurface pattern 14 includes more sub patterns 141 (e.g., 10,000 sub patterns 141 for an arrangement of 100 rows and 100 columns).

In Embodiment 3, each of the sub patterns 141 (i.e., the metasurface pattern 14) is made of a metal (aluminum, in Embodiment 3). The metasurface pattern 14 as illustrated in (a) of FIG. 4 can be obtained by, for example, forming a continuous film of aluminum on the principal surface 111, and then using lithography technology. Aluminum is resistant to corrosion and less expensive than gold. Note that the metasurface pattern 14 is not limited to aluminum, but may be made of another metal (e.g., gold, silver, copper). Gold is easy to process and resistant to corrosion, but is expensive. In Embodiment 3, the aluminum forming the sub pattern 141 is pure aluminum, which is not an alloy. Even pure aluminum, which is of high purity, contains trace amounts of impurities. The performance of the metasurface pattern 14 varies depending on the degree of purity of aluminum. This is because optical constants (refractive index, extinction coefficient) change according to the degree of purity of aluminum and the degree of purity of aluminum therefore affects the optical characteristics.

Each sub pattern 141 has the shape of a 300-nm square. Each sub pattern 141 has a thickness (i.e., the thickness of the metasurface pattern 14) of 30 nm. The thickness of each sub pattern 141 is preferably not less than 20 nm and not more than 60 nm. The performance of the metasurface pattern 14 changes according to the thickness of each sub pattern 141. The guideline of the lower limit of the thickness of each sub pattern 141 is the skin depth. Note that the skin depth is the depth of skin determined due to the skin effect, and is the depth of a region of a metal, the region having an increased electromagnetic field density when the metal is irradiated with an electromagnetic wave of a certain frequency. When the thickness of each sub pattern 141 is closer to the skin depth, the optical characteristics become worse because, for example, light is not sufficiently reflected. On the other hand, when each sub pattern 141 is thick, generation of another resonant mode and shift of the resonance wavelength are caused, for example. Further, when each sub pattern 141 is thick, the difficulty in producing the sub pattern 141 increases.

Note that the periodic arrangement in the metasurface pattern 14, the material of the metasurface pattern 14, the shape of each sub pattern 141, the size of each sub pattern 141, and the thickness of each sub pattern 141 are not limited to those described above, but can be appropriately determined by reference to existing technology.

The force sensor 10 includes a protective layer 15 (which will be described later) for the purpose of reducing or preventing oxidation of the metasurface pattern 14 during cleaning. Another idea for inhibiting oxidation of the metasurface pattern 14 without using the protective layer 15 is to use, as the material of the metasurface pattern 14, a material resistant to oxidation, typified by gold and platinum. However, gold and platinum are expensive and therefore not preferable from the perspective of reducing the cost of producing the force sensor 10.

The protective layer 15 is provided so as to completely cover each of the sub patterns 141 that constitute the metasurface pattern 14 on the principal surface 111 of the first substrate 11, as illustrated in (a) of FIG. 4. The protective layer 15 is transparent to light, as is true for the first substrate 11.

In Embodiment 3, the protective layer 15 is a continuous film made of quartz-glass ($SiO_2$). In Embodiment 3, the protective layer 15 has a thickness of 35 nm. The thickness of the protective layer 15 is not limited to this example, but can be appropriately determined. The thickness of the protective layer 15 is preferably not less than 35 nm and not more than 60 nm.

A protective layer 15 is provided for the purpose of reducing or preventing, in a step of cleaning the first substrate 11 provided with the metasurface pattern 14, oxidation of the metasurface pattern 14 (in particular, oxidation on the surface of the metasurface pattern 14) that can be caused by direct exposure of the metasurface pattern 14 to a cleaning liquid (for example, pure water). It is therefore preferable that the protective layer 15 be transparent to light and be formed by a film dense enough that the film does not transmit the cleaning liquid.

The protective layer 15 may be any layer provided that the layer is capable of reducing or preventing the aforementioned oxidation of the metasurface pattern 14. The material, the film-deposition method, the thickness, etc. of the protective layer 15 can be appropriately determined.

<Second Substrate 12>

The second substrate 12 is a plate-shaped member (strain element) designed to deflect when subjected to the action of the point load $F_E$. The second substrate 12 is provided so as to face the first substrate 11, as illustrated in FIG. 3. In Embodiment 3, a polycarbonate resin is employed as the material of the second substrate 12. Note that the material of the second substrate 12 only needs to be a solid-state material that deflects when subjected to the action of the point load $F_E$, and can be appropriately selected from among commercially available materials. Other examples of the material of the second substrate 12 include: a resin material typified by an acrylic resin, a polystyrene resin, an AS resin, and a silicone resin; and a metal material typified by aluminum, copper, and stainless steel.

In Embodiment 3, the shape (see (b) of FIG. 4) of the second substrate 12 in plan view is a 4-cm square, as is true for the first substrate 11. In Embodiment 3, the second substrate 12 has a thickness of 300 μm. The shape and thickness of the second substrate 12 are not limited to these examples, but only need to be designed such that the second substrate 12 deflects with an appropriate amount of deflection when subjected to the action of the point load $F_E$. The thickness of the second substrate 12 is preferably not less than 300 μm and not more than 400 μm.

The second substrate 12 includes a principal surface 121 and a principal surface 122 that are opposed to each other and that constitute a pair of principal surfaces. The principal surface 121, which is an example of the second principal surface, faces the principal surface 111 of the first substrate 11. The principal surface 122, which is opposed to the principal surface 121, is an example of a third principal surface. In the condition illustrated in FIG. 3, the second substrate 12 is disposed such that the principal surface 121 is located on the lower side and the principal surface 122 is located on the upper side.

The reflective layer 16 is provided on the principal surface 121 of the second substrate 12, as illustrated in FIG. 3 and (b) of FIG. 4. The reflective layer 16 is a metal film that reflects the light L1 and accordingly generates light L2 that is a reflected light of the light L1. In Embodiment 3, aluminum is employed as the material of the reflective layer 16. Note that the material of the reflective layer 16 only needs to be a solid material that reflects the light L1, and can be appropriately selected from among commercially available metals. Other examples of the material of the reflective layer 16 include gold and silver. In a case where the material of the reflective layer 16 is the same as the metal of the metasurface, the process is simplified and the cost is advantageously reduced. Further, the second substrate 12 does not only need to be a metal having a high reflectance. In the force sensor module 50, the second substrate 12 and the metasurface pattern 14 are integrated with each other through the surface plasmon polariton to form an optical resonator. It is therefore considered that changing the metal of the second substrate 12 also affects the optical characteristics.

In Embodiment 3, the reflective layer 16 has a thickness of 50 nm. The thickness of the reflective layer 16 is not limited to this example, but can be appropriately determined. The thickness of the reflective layer 16 is preferably not less than 50 nm and not more than 100 nm.

The material, the film-deposition method, the thickness, etc. of the reflective layer 16 can be appropriately determined.

The hard-coat layer 17 is provided on the principal surface 122, as illustrated in FIG. 3. In Embodiment 3, the hard-coat layer 17 is provided so as to completely cover a surface of the second substrate 12. The hard-coat layer 17 may be provided so as to further cover the lateral surface of the second substrate 12.

The hard-coat layer 17 is a covering layer designed in the same way as is the covering layer provided on the surface of a smartphone, a display panel, or the like. In Embodiment 3, a silicone resin is employed as the material of the hard-coat layer 17. Note that the material of the hard-coat layer 17 is not limited to this. Other examples of the material of the hard-coat layer 17 include an acrylic resin and a fluororesin.

The hard-coat layer 17 is harder than the material (a polycarbonate, in Embodiment 3) of the second substrate 12, and is therefore resistant to scratching. In addition, the hard-coat layer 17 has a property of being less prone to transmit a gas.

The hard-coat layer 17 preferably covers as wide a region as possible of a surface of the second substrate 12, the region including an area of contact with the force transferring section 3.

In a case where the second substrate 12 is made of a resin, the principal surface 121, which is a surface of the second substrate 12 facing the first substrate 11, may be provided with a covering layer that is the same as the hard-coat layer 17.

In a case where the second substrate 12 is made of a resin, the amount of an outflow of a gas that may be generated from the resin can be reduced by the hard-coat layer.

<Spacer 13>

The spacer 13 is a member for defining the spacing (the spacing under no load) between the first substrate 11 and the second substrate 12, as illustrated in FIG. 3. As a joining member for joining the spacer 13 to each of the first substrate 11 and the second substrate 12, a photo-curable resin is used. Note that the joining member is not limited to this, but can be appropriately selected from among commercially available joining members.

In Embodiment 3, the thickness of the spacer 13 is determined such that the spacing G between the protective layer 15 and the reflective layer 16 is 190 nm. Further, the amount of deflection of the second substrate 12 observed when the point load $F_E$ acts on the center of the second substrate 12 or on the vicinity of the center is defined as the amount of deflection ΔG. When subjected to the action of the point load $F_E$, the second substrate 12 deflects with the amount of deflection ΔG. This causes the spacing G to be narrower by the amount of deflection ΔG than the spacing G measured under no load.

As above, interposing the spacer 13 between the first substrate 11 and the second substrate 12 causes the spacing between the first substrate 11 and the second substrate 12 to be fixed. Specifically, a loop-shaped frame, as illustrated in (c) of FIG. 4, having an outer edge and an inner edge each of which is square is employed as the spacer 13. In Embodiment 3, the outer edge of the spacer 13 measures 4 cm per side, and has an outline that is the same in shape as the outline of the first substrate 11 and the second substrate 12. Note that the shape of the outer edge of the spacer 13 is not limited to this, and can be appropriately determined.

<Internal Space 10S>

The force sensor 10 can be obtained by stacking the first substrate 11, which is provided with the metasurface pattern 14 and the protective layer 15, the spacer 13, and the second substrate 12, which is provided with the reflective layer 16 and the hard-coat layer 17, in this order and then joining the first substrate 11, the spacer 13, and the second substrate 12 together, as illustrated in FIG. 3. Therefore, the metasurface pattern 14, the protective layer 15, and the reflective layer 16 are accommodated in an internal space 10S surrounded by the first substrate 11, the second substrate 12, and the spacer 13.

The internal space 10S of the force sensor 10 illustrated in FIG. 3 is sealed. According to an aspect of the present invention, the internal space 10S may be unsealed. In a case where the internal space 10S is unsealed, at least one selected from the group consisting of the first substrate 11, the second substrate 12, and the spacer 13 only needs to be provided with a vent that brings the internal space 10S and the space external to the force sensor 10 (the accommodation space S illustrated in FIG. 1, etc.) into communication with each other.

In the force sensor 10 in accordance with Embodiment 3, the metasurface pattern 14 provided on the first substrate 11 is protected by the protective layer. This makes it possible to prevent direct exposure of the metasurface pattern 14 to a cleaning liquid even in a case where the first substrate 11 including the metasurface pattern 14 is cleaned in a step following the formation of the metasurface pattern 14 on the principal surface 111. If the metasurface pattern is directly exposed to a cleaning liquid, the surface of the metasurface pattern can be oxidized. Even in a case where the first substrate 11 including the metasurface pattern 14 is cleaned in the production process, the force sensor 10 makes it possible to reduce adverse effects including oxidation that may be caused in the metasurface pattern 14. It is therefore possible for the force sensor 10 to offer desired response characteristics specified at the time of design.

The second substrate 12 of the force sensor 10 is preferably made of a metal or a resin. This configuration, unlike the configuration in which the second substrate 12 is made of glass, makes it possible to reduce the possibility that the second substrate 12 is broken even in a case where a greater-than-expected force acts on the second substrate 12. Accordingly, the force sensor 10 of this type makes it possible to increase the safety upon the action of a greater-than-expected force.

It is possible to make larger the ranges of choices of the Young's modulus and the Poisson's ratio of the material of the second substrate 12 in a case of employing the second substrate 12 made of a metal or a resin than in a case of employing the second substrate made of glass. The response characteristics of the force sensor 10 (e.g., the detectable range of force, and the resolution with which a force can be detected) depend on the amount of deflection ΔG observed when the point load $F_E$ acts. That is, the response characteristics of the force sensor 10 depend on the Young's modulus and the Poisson's ratio of the material of the second substrate 12. For this reason, selecting the material of the second substrate 12 of the force sensor 10 from among metals and resins, rather than glass, makes it possible to enlarge the range of variations of feasible response characteristics. That is, it is possible to enlarge the range of variations of the product lineup of the force sensor 10.

The force sensor 10 includes the hard-coat layer 17. In a case where a resin is employed as the material of the second substrate 12, a gas can continue to be generated from the second substrate 12 even after the force sensor 10 is produced. With the aforementioned configuration, the principal surface 122 of the second substrate 12 is covered by the hard-coat layer 17. The material of the hard-coat layer 17 not only has a high hardness but also is capable of reducing the transmission of a gas. It is therefore possible, in the force sensor 10, to reduce the amount of a gas that may be generated from the second substrate 12.

The internal space 10S of the force sensor 10 is preferably sealed. With this configuration, it is possible to prevent foreign matter (e.g., air dust) from entering the internal space 10S. It is therefore possible, in the force sensor 10, to easily keep the response characteristics expected at the time of design.

It is possible to employ, in the force sensor 10, another configuration in which the internal space 10S and the space external to the force sensor 10 are in communication with each other. With the aforementioned configuration, the internal space 10S is not sealed. This makes it possible to maintain the spacing G, under no load, between the first substrate 11 and the second substrate 12 at a predetermined spacing, even in a case where pressure in the external space changes. This makes it possible for this variation of the force sensor 10 to exhibit response characteristics expected at the time of design, regardless of the pressure in the external space.

The main part 1 of the force sensor module of each of the aforementioned embodiments is formed by accommodating, in the accommodation space S of the housing 2 illustrated in FIG. 1 and FIG. 2, the force sensor 10 having the aforementioned configuration. The components of the force sensor module other than the main part 1 will be described with reference to FIG. 3.

(Other Components of Force Sensor Module 50)

The force sensor module 50 includes, in addition to the main part 1, an optical circulator 23, an optical fiber 24, and a collimating lens 25.

The optical circulator 23 is an optical device that has three ports P1, P2, and P3. The optical circulator 23 is configured to: release, from the port P2, light that enters the port P1; release, from the port P3, light that enters the port P2; and release, from the port P1, light that enters the port P3. Instead of the optical circulator 23, an optical combiner may be provided.

The optical fiber 24 allows the light L1 released from the port P2 of the optical circulator 23 to be released to the collimating lens 25 and allows light L2 entering through the collimating lens 25 to enter the port P2.

The collimating lens 25 converts the light L1 released from one end of the optical fiber 24 into collimated light. The light L1 having been collimated by the collimating lens 25 is converted, by reflection off the reflective layer 16, into the light L2, which in turn propagates in the reverse direction of the same path. The light L2 enters the one end of the optical fiber 24 through the collimating lens 25. The collimating lens efficiently couples the light L2, which is collimated light as is true for the light L1, to the one end of the optical fiber 24.

(Configuration of Force Sensor System 60)

The force sensor system 60 includes, in addition to the force sensor module 50 described above, a light source 20, an optical fiber 22, an optical fiber 26, and a light detecting section 27, as illustrated in FIG. 3.

The light source 20 is configured to emit the light L1 having a wavelength band of not less than 1400 nm and not more than 1600 nm. In Embodiment 3, a light-emitting diode (LED) that radiates near infrared rays is used as the light source 20. However, the light source 20 is not limited to an LED, but can be appropriately selected from among commercially available light sources. Further, the light source includes a filter that is provided downstream of this LED and that limits the wavelength band of the light L1 to not less than 1400 nm and not more than 1600 nm.

The light detecting section 27 is a component for measuring the spectrum of the light L2 (reflection spectrum, in Embodiment 3). In Embodiment 3, the light detecting section 27 includes: a spectroscope that disperses the light L2; and a photodiode that converts, into an electrical signal, light of each of the wavelength components of the light L2 having been dispersed.

The inserted figure in FIG. 3 is a graph schematically indicating the spectrum of the light L1, which is input light of the force sensor 10, and the spectrum of the light L2, which is output light of the force sensor 10. In the inserted figure, the spectrum of the light L1 is indicated by a solid line, and the spectrum of the light L2 is indicated by a dashed line.

As can be seen from the inserted figure, in comparison with the central wavelength of the spectrum of the light L1, the central wavelength of the spectrum of the light L2 is shifted toward longer wavelengths by a shift amount of $\Delta\lambda$. The shift amount $\Delta\lambda$ is a quantity determined according to the spacing G illustrated in FIG. 3. The spacing G is a quantity determined according to the amount of deflection $\Delta G$ of the second substrate 12 observed when the point load $F_E$ acts on the center of the second substrate 12 or on the vicinity of the center. Accordingly, the shift amount $\Delta\lambda$ of the force sensor is a quantity determined according to the magnitude of the point load $F_E$. In the force sensor module 50, the correlation between the point load $F_E$ and the shift amount $\Delta\lambda$ of the force sensor 10 is acquired or calculated in advance. It is therefore possible to detect the point load $F_E$.

(Variation)

Although the aspect illustrated in FIG. 3 is an aspect in which the entry and release of light are implemented by a single port, the present invention is not limited to this aspect, but may encompass an aspect in which an entrance port and an release port are separately provided. This aspect will be described with reference to FIG. 5.

Figure 5:
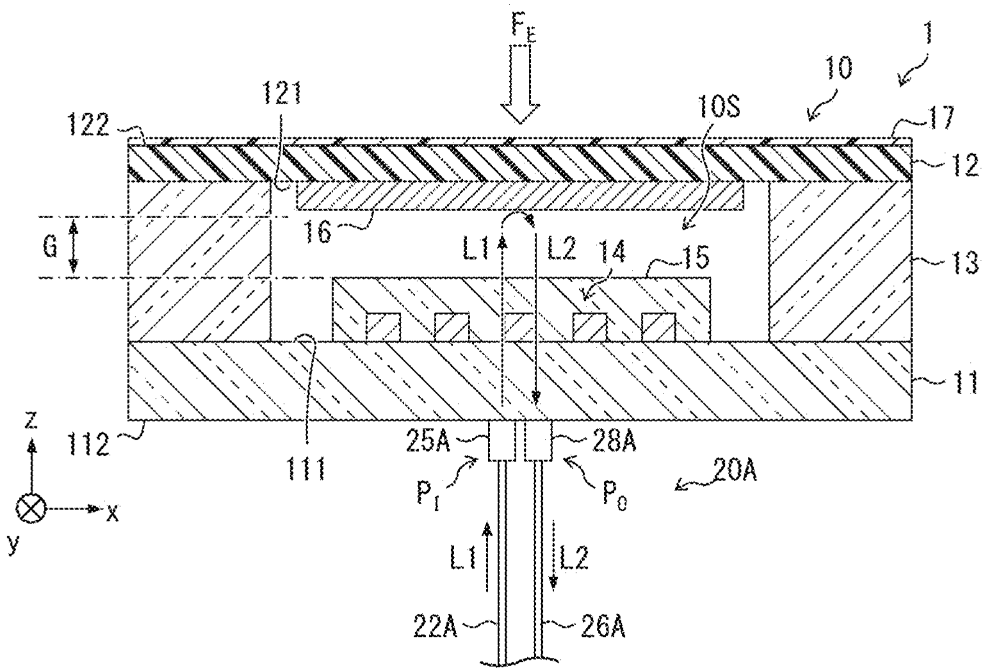
FIG. 5 is a diagram illustrating another embodiment of the force sensor module in accordance with Embodiment 1 of the present invention and including a cross-sectional view of the main part.

FIG. 5 is a diagram of the configuration of a variation of the force sensor system 60 including the force sensor module 50. The configuration of the force sensor 10, which forms a part of the main part 1 of the force sensor module 50, is viewed in cross section, and this cross-sectional view is the same as that of the force sensor 10 illustrated in FIG. 3.

In the aspect of FIG. 5, the first substrate 11 is provided with an entrance port $P_I$ through which light enters the internal space 10S and a release port $P_O$ through which light is released from the internal space 10S, on the principal surface 112-side thereof.

To the entrance port $P_I$, a first optical fiber 22A is connected at one end thereof. The entrance port $P_I$ is provided with a diffusing lens 25A.

The first optical fiber 22A is provided such that the optical axis at the one end extends along the normal direction of the first substrate 11. The other end of the first optical fiber 22A is connected to the light source 20 illustrated in FIG. 3.

The light L1 that is diffused by the diffusing lens 25A and enters the internal space 10S is reflected by the reflective layer 16 to become the light L2, which is reflection light. The light L2 then passes through the first substrate 11 and enters the release port $P_O$.

The release port $P_O$ is provided with a condenser lens 28A. Further, to the release port $P_O$, a second optical fiber 26A is connected at one end thereof.

The second optical fiber 26A is provided such that the optical axis thereof extends along the normal direction of the first substrate 11. The other end of the second optical fiber 26A is connected to the light detecting section 27 illustrated in FIG. 3. The light L2 having been concentrated by the condenser lens 28A of the release port $P_O$ enters the light detecting section 27 through the second optical fiber 26A.

Embodiment 4

The following description will discuss another embodiment of the present invention. For convenience of explanation, the same reference numerals will be given to members having the same functions as the members described in the above embodiments, and the descriptions of such members are not repeated.

Figure 6:
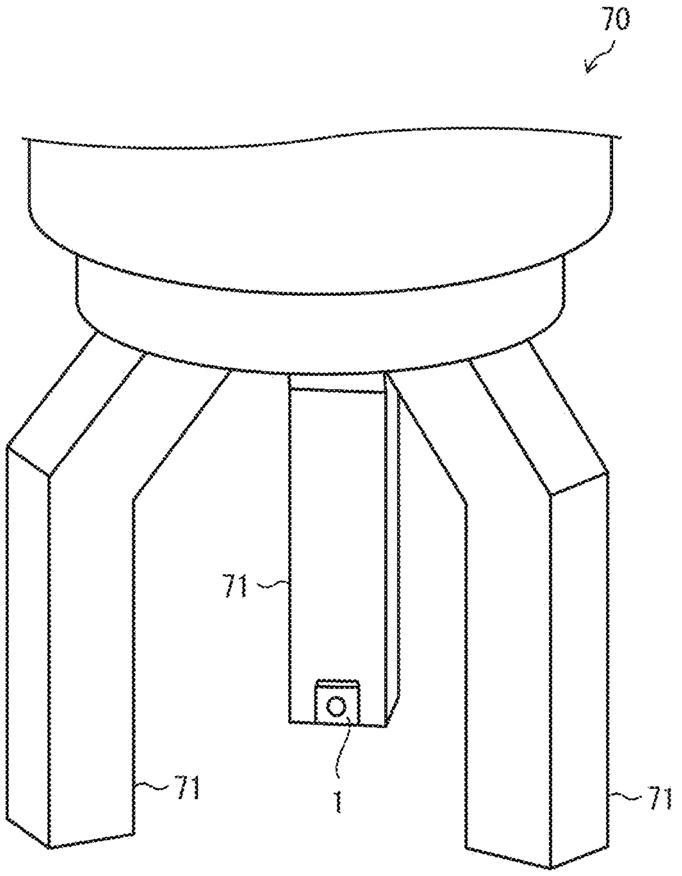
FIG. 6 is a schematic perspective view of a robot hand that is an example of an acquiring device in accordance with an aspect of the present invention.

The main part 1 of the force sensor module 50 of each of the aforementioned embodiments can be installed in a finger portion of a robot hand (acquiring device) that grasps and acquires an acquisition target (load applying object Ob). FIG. 6 is a schematic perspective view of an example of the robot hand. A robot hand 70 is provided with a finger portion 71. The finger portion 71 has a region in which to contact an acquisition target. The main part 1 of the force sensor module 50 of each of the aforementioned embodiments is provided in the finger portion 71. With this provision of the main part 1 in the finger portion 71, it is possible for the force sensor 10 to detect, through the force transferring section 3, that the finger portion 71 has grasped the acquisition target.

The main part 1 of the force sensor module 50 is not applied only to a robot hand. For example, when installed in an acquiring device (instrument) that acquires an acquisition target, the main part 1 can be applied to detecting acquisition of the acquisition target. Further, for example, when installed in medical (surgical) forceps (acquiring device), the main part 1 can be applied to detecting that the forceps have held the acquisition target (e.g., tissue).

In Embodiment 3, since an external force is accurately transferred to the force sensor 10 through the force transferring section 3, it is possible to detect even a small force of the order of millinewtons. Accordingly, in the above application examples of the robot hand and the forceps, it is possible to prevent the acquisition target from being caught or held with an excessive force and thus avoid the acquisition target being damaged by such a force.

SUPPLEMENTARY NOTE

The present invention is not limited to the above embodiments, but can be altered by a skilled person in the art within the scope of the claims. The present invention also encompasses, in its technical scope, any embodiment derived by combining technical means disclosed in differing embodiments.

REFERENCE SIGNS LIST

50: Force sensor module
1: Main part of force sensor module
2: Housing
3: Force transferring section
31: Fluid spring
311: Elastic body
312: Fluid
32: Projection
10: Force sensor
11: First substrate
12: Second substrate
13: Spacer
14: Metasurface pattern
15: Protective layer
16: Reflective layer
17: Hard-coat layer
20: Light source
22A: First optical fiber
23: Optical circulator
24: Optical fiber
25: Collimating lens
26: Optical fiber
26A: Second optical fiber
27: Light detecting section
29: Optical fiber
60: Force sensor system
70: Robot hand (acquiring device)
71: Finger portion (region in which to contact acquisition target)
$P_O$: Release port
$P_I$: Entrance port
$P_{IO}$: Port

The invention claimed is:

1. A force sensor module comprising:
a force sensor including a strain element that deflects in response to an external force and configured to detect the external force according to the amount of deflection of the strain element;
a housing that accommodates the force sensor; and
a force transferring section configured to transfer the external force to the strain element, the force transferring section being accommodated in the housing so as to be in contact with the strain element and having a part that includes an end of the force transferring section and that protrudes outside the housing through a surface of the housing,
the amount of protrusion of the part of the force transferring section measured from the surface of the housing being set such that the force sensor is not damaged even in a case where the end lies in the same plane as the surface of the housing,
the force transferring section including a fluid spring that includes: an elastic body having a hollow portion and a fluid with which the hollow portion is filled, and
as the part of the force transferring section, a part of the elastic body protruding outside the housing.

2. The force sensor module according to claim 1, wherein the force transferring section further includes a projection interposed between the elastic body and the strain element and projecting from the elastic body, and
the projection is made of a material that is less prone to deformation than the elastic body is.

3. The force sensor module according to claim 2, wherein the strain element has a surface that has a non-slip structure in a region, facing the projection, of the surface.

4. An acquiring device for acquiring an acquisition target, the acquiring device having a region in which to contact the acquisition target and in which the force sensor module according to claim 1 is provided.

5. A force sensor module comprising:
a force sensor including a strain element that deflects in response to an external force and configured to detect the external force according to the amount of deflection of the strain element;
a housing that accommodates the force sensor; and
a force transferring section configured to transfer the external force to the stain element, the force transferring section being accommodated in the housing so as to be in contact with the strain element and having a part that includes an end of the force transferring section and that protrudes outside the housing through a surface of the housing,
the amount of protrusion of the part of the force transferring section measured from the surface of the housing being set such that the force sensor is not damaged even in a case where the end lies in the same plane as the surface of the housing,
the force sensor including:
a first substrate having light transparency;
a metasurface pattern provided on a first principal surface of the first substrate;
a second substrate provided so as to face the first substrate and including a second principal surface that faces the first principal surface;
a reflective layer provided on the second principal surface; and
a spacer defining a spacing between the first substrate and the second substrate, and
the second substrate being the strain element.

6. The force sensor module according to claim 5, wherein the second substrate is made of a resin, and
the force sensor module further comprises
a hard-coat layer covering a third principal surface that is one of a pair of principal surfaces of the second substrate and that is opposed to the second principal surface.

7. The force sensor module according to claim 5, wherein the first substrate, the second substrate, and the spacer form an internal space that accommodates the metasurface pattern and the reflective layer,
the first substrate is provided with an entrance port through which light enters the internal space and a release port through which light is released from the internal space, and
the force sensor module further comprises:
a first optical fiber having an end which is connected to the entrance port such that an optical axis at the end of the first optical fiber extends along the normal direction of the first substrate; and
a second optical fiber having an end which is connected to the release port such that an optical axis at the end of the second optical fiber extends along the normal direction of the first substrate.

8. The force sensor module according to claim 5, wherein the first substrate, the second substrate, and the spacer form an internal space that accommodates the metasurface pattern and the reflective layer,
the first substrate is provided with a port through which light enters the internal space and through which light is released from the internal space, and
the force sensor module further comprises:
an optical fiber having one end which is connected to the port such that an optical axis at the one end extends along the normal direction of the first substrate; and
an optical combiner or an optical circulator provided at the other end of the optical fiber.

9. A force sensor system comprising:
the force sensor module according to claim 8;
a light source connected to the optical combiner or the optical circulator through an optical fiber; and
a light detecting section connected to the optical combiner or the optical circulator through an optical fiber.

10. The force sensor module according to claim 5, wherein a space that accommodates the force sensor in the housing is an accommodation space,
the force sensor module further comprises a preload adjustment mechanism for adjusting a position, in the normal direction of the first principal surface, of the force sensor in the accommodation space, to adjust a preload to be applied to the strain element, and
the preload is a force that is being applied by the force transferring section to the strain element under a condition where the external force is not applied to the force transferring section.

11. The force sensor module according to claim 10, wherein the preload adjustment mechanism includes an elastic body containing a fluid therein.

* * * * *